United States Patent [19]

Stix et al.

[11] Patent Number: 4,663,424
[45] Date of Patent: May 5, 1987

[54] AROMATIC POLYESTER WITH DIMETHYLMALEIMIDE END GROUPS

[75] Inventors: Wolfgang Stix, Neckarsteinach; Ludwig Bottenbruch, Krefeld, both of Fed. Rep. of Germany

[73] Assignee: Bayer Aktiengesellschaft, Leverkusen, Fed. Rep. of Germany

[21] Appl. No.: 799,992

[22] Filed: Nov. 20, 1985

[30] Foreign Application Priority Data

Nov. 27, 1984 [DE] Fed. Rep. of Germany ....... 3443090

[51] Int. Cl.$^4$ .............................................. C08G 63/12
[52] U.S. Cl. ................................... 528/182; 522/104; 522/107; 525/439; 525/444; 525/462; 525/466; 528/176
[58] Field of Search ................ 528/182, 176; 522/104, 522/107; 525/439, 444, 462, 466

[56] References Cited

U.S. PATENT DOCUMENTS 3,399,172 8/1968 Jaquiss ................................. 528/182
4,107,174 8/1978 Baumann ............................ 260/326
4,174,326 11/1979 Baumann et al. ................... 260/326
4,301,075 11/1981 Lehmann et al. ................ 260/326.5
4,393,190 7/1983 Tyrell et al. ......................... 528/182

Primary Examiner—Harold D. Anderson
Attorney, Agent, or Firm—Gene Harsh; Joseph C. Gil; Aron Preis

[57] ABSTRACT

The present invention relates to aromatic polyester(carbonate)s with end groups of the formula (Ib)

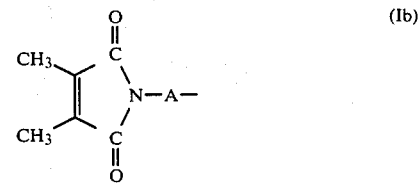

optionally mixed with known aromatic polyester(carbonate)s, their preparation by the phase boundary process or in homogeneous solution and their modification by irradiation.

14 Claims, No Drawings

AROMATIC POLYESTER WITH DIMETHYLMALEIMIDE END GROUPS

The present invention relates to a process for the preparation of aromatic polyesters with dimethylmaleimide end groups with average molecular weights $\overline{M}w$ (weight-average, determined by light scattering) of between 3,000 and 150,000, preferably between 10,000 and 100,000 and particularly preferably between 20,000 and 80,000, optionally mixed with known aromatic polyesters with an $\overline{M}w$ (weight-average, determined by light scattering) of between 3,000 and 150,000, preferably between 10,000 and 100,000 and particularly preferably between 20,000 and 80,000, from diphenols, 0.5 to 40 mol %, preferably 1 to 20 mol % and particularly preferably 1.5 to 10 mol %, based on the moles of diphenols, of chain stoppers, terephthalic acid dichlorides, isophthalic acid dichlorides, the ratio of the aromatic acid chlorides being between 7:3 and 3:7, and optionally phosgene in amounts of up to not more than 100 mol %, based on the moles of aromatic acid dichlorides employed, by the known methods of the phase boundary process or the process in homogeneous solution, which is characterized in that chain stoppers of the formula (I)

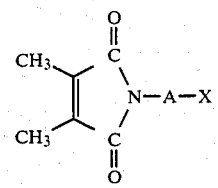

(I)

are used, optionally in combination with not more than 3 times the molar amounts, preferably not more than the same molar amounts, based on the moles of chain stoppers (I), of other known chain stoppers.

In the present connection, "aromatic polyesters" are understood as meaning both polycondensates, the polymer chain of which is built up only from carboxylic acid ester bonds, and those which additionally contain carbonate bonds and are usually designated polyester carbonates.

In the chain stoppers of the formula (I), the X—A—radicals are X—$C_1$-$C_8$-alkyl, X—$C_5$-$C_6$-cycloalkyl, X—$C_7$-$C_{28}$-aralkyl or radicals of the formula

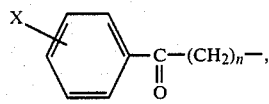

wherein
"n" is an integer from 1 to 8 and
X—is a functional group which functions as the reactive part of the chain stoppers of the formula (I) in the preparation of polyesters by the two-phase boundary process or by the process in a homogeneous phase system (pyridine process).
X—can be, for example,

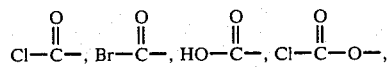

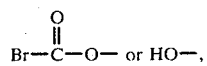

and, in the case of the two-phase boundary process, aliphatic and cycloaliphatic OH groups must be converted into reactive and stable chlorocarbonic acid ester end groups or aromatic carboxylic acid chloride end groups. X—is preferably

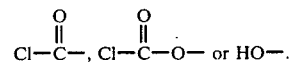

In the abovementioned X—A—radicals, alkyl is straight-chain or branched. Examples of X—A—radicals are

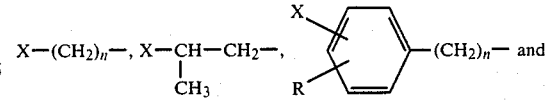

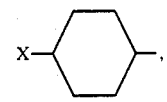

wherein
R is H or $CH_3$ and
"n" is an integer from 1 to 8.

The chain stoppers of the formula (I) are either known (see, for example, DE-OS (German Published Specification) No. 2,626,795 or DE-OS (German Published Specification) No. 2,934,578), or they can be obtained by known processes from dimethylmaleic anhydride with the corresponding primary amines according to the following equation:

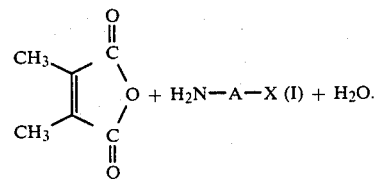

In the cases where X is an acid halide or halogenocarbonic acid ester group, the conversion from the corresponding COOH groups or OH groups is carried out by generally known processes.

Examples of chain stoppers of the formula (I) are:

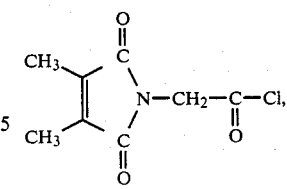

-continued $$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!CH_2\!\!-\!\!CH_2\!\!-\!\!OH,$$

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!CH_2\!\!-\!\!\!\!\bigcirc\!\!\!\!-\!\!\overset{\overset{O}{\|}}{C}\!\!-\!\!Cl,$$

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!CH_2\!\!-\!\!CH_2\!\!-\!\!O\!\!-\!\!\overset{\overset{O}{\|}}{C}\!\!-\!\!Cl \text{ and}$$

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!CH_2\!\!-\!\!CH_2\!\!-\!\!\!\!\bigcirc\!\!\!\!-\!\!OH$$

The chain stoppers which contain chlorocarbonic acid ester end groups and are suitable for the two-phase boundary process have the formula (Ia)

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!A'\!\!-\!\!O\!\!-\!\!\overset{\overset{O}{\|}}{C}\!\!-\!\!O\!\!-\!\!Z\!\!-\!\!O\!\!-\!\!\overset{\overset{O}{\|}}{C}\!\!-\!\!Cl \quad \text{(Ia)}$$

wherein
A' is a $C_2$-$C_8$-alkylene radical or $C_5$-$C_6$-cycloalkylene radical and
—O—Z—O—is a diphenolate radical with preferably 6 to 30 C atoms.

Such intermediates (Ia) are obtainable in a known manner from the corresponding chain stoppers (I) containing OH groups with bishalogenocarbonic acid esters of diphenols (III) HO—Z—OH (III).

The aromatic chain stoppers which contain carboxylic acid chloride end groups and are suitable for the two-phase boundary process have the formula (Ia')

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!A'\!\!-\!\!O\!\!-\!\!\overset{\overset{O}{\|}}{C}\!\!-\!\!\!\!\bigcirc\!\!\!\!-\!\!\overset{\overset{O}{\|}}{C}\!\!-\!\!Cl \quad \text{(Ia')}$$

wherein A' has the meaning given in formula (Ia).

Other known chain stoppers which are also to be used in the process according to the invention are, for example, phenols, carboxylic acid halides or chlorocarbonic acid esters.

Examples of the known chain stoppers which are also to be used are phenol, p-tert.-butylphenol, 2,6-dimethylphenol and p-isooctylphenol.

The present invention also relates to the aromatic polyesters, obtainable by the process according to the invention, with end groups of the formula (Ib)

$$CH_3\!\!-\!\!\underset{CH_3}{\overset{\phantom{CH_3}}{\diagdown}}\!\!\underset{\underset{\underset{O}{\|}}{C}}{\overset{\overset{O}{\|}}{C}}\!\!\diagup\!\!N\!\!-\!\!A\!\!- \quad \text{(Ib)}$$

wherein —A—has the meaning given in the case of formula (I), optionally mixed with known aromatic polyesters, with an $\overline{M}w$ of between 3,000 and 150,000 ($\overline{M}w$ determined by light scattering), which result from interruption of the chain with the other known chain stoppers.

In the context of the present invention, the polyester carbonates also included under "polyesters" can have up to not more than 50 mol % of aromatic dicarboxylic acid radicals $$-\!\!O\!\!-\!\!\overset{\overset{O}{\|}}{C}\!\!-\!\!\!\!\bigcirc\!\!\!\!-\!\!\overset{\overset{O}{\|}}{C}\!\!-\!\!O\!\!-$$

replaced by carbonate radicals $$-\!\!O\!\!-\!\!\overset{\overset{O}{\|}}{C}\!\!-\!\!O\!\!-.$$

Aromatic polyesters obtainable according to the invention with average molecular weights $\overline{M}w$ (weight-average, determined by light scattering) of between 3,000 and 150,000 are preferably those of the formula (II)

$$E\!\!-\!\![O\!\!-\!\!Z\!\!-\!\!O\!\!-\!\!D]_{\overline{p}}\!\!O\!\!-\!\!Z\!\!-\!\!O\!\!-\!\!E' \quad \text{(II)}$$

wherein
—O—Z—O—is a diphenolate radical with preferably 6 to 30 C atoms,
—D—is $$-\!\!\overset{\overset{O}{\|}}{C}\!\!-\!\!\!\!\bigcirc\!\!\!\!-\!\!\overset{\overset{O}{\|}}{C}\!\!-, -\!\!\overset{\overset{O}{\|}}{C}\!\!-\!\!\!\!\bigcirc\!\!\!\!\underset{\underset{\overset{O}{\|}}{C}\!\!-}{}\!\!, \text{ or } -\!\!\overset{\overset{O}{\|}}{C}\!\!-,$$

it being possible for up to not more than 50% of the —D—radicals to be

radicals, and the ratio of

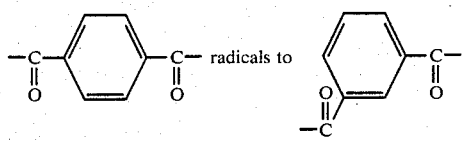

radicals being between 3:7 and 7:3,

E and E' are identical or different, at least one of the radicals E—or E'—corresponding to a radical of the formula (Ic)

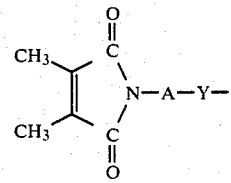

(Ic)

wherein
—A— has the meaning given for formula (I) and
—Y— is the bonding member which results from reaction of the chain stoppers of the formula (I), optionally incorporating one of the aromatic acid dichlorides or phosgene, the remaining end groups E and E' resulting from the reaction with the other known chain stoppers, optionally incorporating one of the aromatic acid dichlorides or phosgene,
and wherein
"p" is the degree of polymerization resulting from the molecular weights $\bar{M}w$ of 3,000 to 150,000.

Examples of bonding members —Y— are

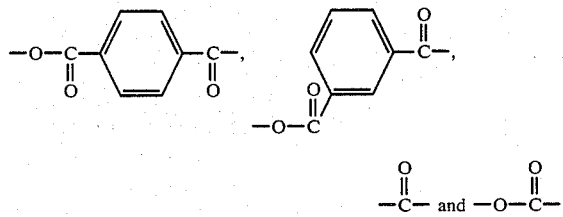

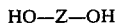.

Because of the maleimide end groups, the aromatic polyesters and polyester mixtures obtainable according to the invention have the ability to increase their molecular weight under the influence of electromagnetic waves.

Compared with known aromatic polyesters (see, for example, the monograph "Polyesters" by V. V. Korshak and S. V. Vinogradova, Pergamon Press, Oxford 1965, pages 494, 485–6 and 454–5) or compared with known aromatic polyester carbonates (see, for example, C. P. Bosnyak et al. in Polymer 23 (1982) 609–12 and DE-AS (German Published Specification) No. 1,495,302, EP-OS (European Published Specification) No. 17,740, EP-OS (European Published Specification) No. 64,153 and U.S. Pat. No. 4,286,083, which corresponds to DOS (German Published Specification) No. 2,758,030), the aromatic polyesters obtainable according to the invention and the mixtures, obtainable according to the invention, of aromatic polyesters thus have the advantage that their molecular weight can be increased during or after the processing phase.

It is therefore possible to use aromatic polyesters which have a relatively low molecular weight and can thus be easily processed; furthermore, higher molecular weights than hitherto can be achieved by conventional methods.

Thermoplastic aromatic polycarbonates with unsaturated end groups are known (see German Offenlegungsschriften (German Published Specifications) Nos. 2,746,139, 2,829,256, 2,843,154 and 2,842,004). The double bonds of these polycarbonates can be utilised for certain reactions (grafting and crosslinking by UV light).

Polycarbonates which have end groups containing conjugated double bonds and which are converted into polycarbonates of higher molecular weight by warming to temperatures of between 150° C. and 400° C., optionally mixed with known polycarbonates, are known from DE-OS (German Published Specification) No. 3,232,391. Branched polycarbonates can thereby give crosslinked, insoluble products.

DE-OS (German Published Specification) No. 3,307,908 (Le A 22 150) describes aromatic polyesters which contain terminal or lateral radicals with two conjugated double bonds and which undergo an increase in their molecular weight by warming to temperatures of 90° to 240° C. and thus acquire improved properties. Branched polyesters can thereby give crosslinked insoluble products.

The disadvantage of the polycondensates according to DE-OS (German Published Specification) No. 3,232,391 and DE-OS (German Published Specification) No. 3,307,908 is that their improved properties are to be achieved only by warming and not by the action of light, such as, for example, under atmospheric weathering.

Crosslinkable polymeric compounds are known from DE-OS (German Published Specification) No. 2,626,769. The polymeric compounds also include, inter alia, polyesters; maleimide groups are described as crosslinking groups. When exposed to light, these polyesters give highly crosslinked insoluble photoresist films, which cannot be used for other applications because of their high brittleness. In contrast, the polyesters obtainable according to the invention are still thermoplastic after irradiation, that is to say are still soluble in the customary solvents for aromatic polyesters.

Diphenols which are suitable for the process according to the invention are those of the formula (III)

HO—Z—OH (III)

which have preferably 6 to 30 C atoms, can be either mononuclear or polynuclear diphenols, can contain heteroatoms and can have substituents which are inert under the conditons of the preparation of the polyesters and under the influence of electromagnetic waves.

Examples which may be mentioned are hydroquinone, resorcinol, dihydroxydiphenyl, bis-(hydroxyphenyl)-alkanes, bis-(hydroxyphenyl)-cycloalkanes, bis-(hydroxyphenyl) sulphides, ethers, ketones, sulphoxides and sulphones and α,α'-bis-(hydroxyphenyl)-diisopropylbenzenes, and their nuclear-alkylated and nuclear-halogenated compounds.

Examples of suitable diphenols are described in U.S. Pat. Nos. 3,028,365, 2,999,835, 3,062,781 and 3,148,172 and in German Offenlegungsschriften (German Published Specifications) Nos. 1,570,703 and 2,063,050.

Preferred diphenols are 4,4'-dihydroxydiphenyl, 2,2-bis-(4-hydroxyphenyl)-propane, 2,2-bis-(4-hydroxyphenyl)-2-methylbutane, 1,1-bis-(4-hydroxyplhenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropyl-benzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Any desired mixtures of the abovementioned diphenols can also be used.

The aromatic polyesters and mixtures of aromatic polyesters according to the invention can be prepared either by the known methods of the phase boundary process (see, for example, DE-OS (German Published Specification) No. 2,940,024 or DE-OS (German Published Specification) No. 2,331,245) or by the process in homogeneous solution, the so-called "pyridine process" (see, for example, U.S. Pat. No. 3,234,168, DE-AS (German Published Specification) No. 1,595,822 or DE-OS (German Published Specification) No. 2,331,245).

Specifically, the procedure used here in the phase boundary process is, for example, as follows:

(a) without also using phosgene:

The diphenols to be employed are dissolved in an aqueous alkaline phase. The chain stoppers required for preparation of the aromatic polyesters according to the invention are added—in bulk or dissolved in an organic solvent. The mixture is then reacted with a mixture of terephthaloyl and isophthaloyl chloride in the presence of a water-immiscible inert solvent which preferably dissolves aromatic polyesters. The reaction temperature is between 0° and 40° C.

(b) also using phosgene:

(See, for example, EP-OS (European Published Specification) No. 0,17,740). The diphenols to be employed are dissolved in an aqueous, alkaline phase. The chain stoppers required for the preparation of the poly(ester carbonates) according to the invention are added—in bulk or dissolved in an organic solvent. The mixture is then reacted with terephthaloyl and isophthaloyl chloride and phosgene in the presence of a water-immiscible inert solvent which preferably dissolves poly(ester carbonates); the acid chlorides and the phosgene are preferably added simultaneously. The reaction temperature is between 0° and 40° C.

In both cases (a) and (b), a pH value which has dropped in the course of the reaction can be increased again by adding further alkali in order to increase the conversion of the polycondensation and thus also the degree of polymerisation of the resulting product.

The chain stoppers required, of the type and in the amount as mentioned above, can also be added during the polycondensation.

Examples of suitable organic solvents for the chain stoppers are methylene chloride, chlorobenzene, mixtures of methylene chloride and chlorobenzene, acetone, acetonitrile and toluene.

Examples of suitable organic solvents for the polyester(carbonate)s are $CH_2Cl_2$ or chlorobenzene.

The reaction can be promoted by catalysts, such as tributylamine or triethylamine. It is also possible additionally to use onium salts, such as, for example, tetraalkylammonium halides, as phase transfer catalysts in order to promote incorporation of the chain stopper.

Moreover, in the case of the two-phase boundary process, aliphatic and cycloaliphatic OH groups of chain stoppers of the formula (I) must be converted into chlorocarbonic acid end groups or aromatic carboxylic acid chloride end groups, for example by prior reaction with a bischlorocarbonic acid ester of a diphenol or with isophthaloyl or terephthaloyl chloride.

The polyester(carbonate)s or polyester(carbonate) mixtures obtainable according to the invention are isolated via the organic phase and washed neutral in a known manner.

The polyesters and polyester mixtures obtainable according to the invention can be shaped by thermoplastic processing methods, for example by extrusion or injection moulding, and by evaporation of polymer solutions, for example in the film-casting process.

The polyesters or polyester mixtures obtainable according to the invention are irradiated either after shaping on shaped articles or in solutions which can then be cast to films. Irradiation is carried out either by irradiating such a solution with an immersion lamp, for example a 10% strength polycarbonate solution in methylene chloride with a mercury immersion lamp, or by irradiating fibres, films or mouldings with a UV lamp.

The resulting polyesters are still thermoplastics which are soluble in polyester solvents.

To accelerate the build-up in the molecular weight of the light-sensitive polymers, the resins according to the invention can contain the customary amounts of known sensitisers. Examples of sensitisers are acetophenone, benzaldehyde, benzoplhenone, diphenyl, benzil, fluorenone and fluorene.

In addition, it should also be noted that the build-up in molecular weight also takes place with light with a wavelength of greater than 400 nm, that is to say in the visible region, so that the molecular weight of the polymers is continuously increased even under the conditions of natural weathering, this also not being prevented by the presence of UV absorbers.

The present invention thus also relates to a process for modifying the aromatic polyesters with end groups of the formula (Ib), which are obtainable according to the invention and can contain UV absorbers, optionally mixed with known aromatic polyesters, which is characterized in that these are irradiated with ultraviolet or with visible light, for example are exposed to natural weathering by sunlight.

In addition to or instead of UV stabilisers, other additives which are customary in polyester chemistry, such as lubricants, nucleating agents, stabilisers towards heat and moisture, fillers, reinforcing substances, flameproofing agents, dyestuffs, pigments and/or impact strength modifiers, can be added in the customary amounts, before or during the shaping of the polyesters, to the polyesters, obtainable according to the invention, with end groups of the formula (Ib), optionally mixed with known aromatic polyesters. It is possible here to use, for example, 10 to 50% by weight, based on the total weight of the moulding composition, of glass fibres, glass beads, mica, silicates, feldspar, quartz, TiO$_2$ and/or wollastonite as fillers or reinforcing substances.

In the cases where the polyesters, obtainable according to the invention, with end groups of the formula (Ib) contain added fillers, reinforcing substances, pigments or rubber-elastic graft polymers, as impact strength modificators, the influence of light is reduced, especially with thicker shaped articles; nevertheless, in these cases also the shaped articles are modified by build-up in molecular weight on the surface.

Solutions of very high molecular weight polyesters, from which cast films for electrical insulation purposes can be obtained, can be prepared by irradiating solutions of the polyesters, obtainable according to the invention, with end groups of the formula (Ib). Until now, high molecular weight polyesters of this type had to be prepared in special apparatuses, because of the very high viscosity of their solutions. It is now possible for polyesters which are obtained in the customary units for the phase boundary process to be used as starting substances, and for solutions thereof, after customary isolation and purification, then to be further treated in a simple manner by irradiation according to the present invention.

The aromatic polyesters obtainable according to the invention and mixtures, obtainable according to the invention, of aromatic polyesters can be employed, before or after irradiation, as shaped articles, in particular as films, for example, in all cases where they are exposed to radiation, such as sunlight during weathering. This is the case, for example, with external components in the construction and automobile sectors, in particular with thin shaped articles and films.

EXAMPLES

1. Prepartion of

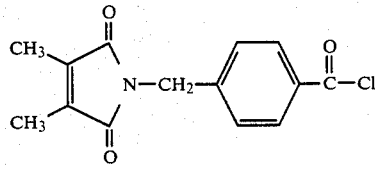

151 g (1 mole) of 4-(aminomethyl)-benzoic acid, 126 g (1 mole) of dimethylmaleic anhydride and 600 ml of glacial acetic acid are warmed to the reflux temperature under nitrogen in a flask with a condenser, stirrer, dropping funnel and nitrogen inlet, and are kept at this temperature for 2 hours. Most of the glacial acetic acid is then distilled off and the resulting mass is recrystallised twice from methanol.

103 g (0.4 mole) of the resulting product are dissolved in one liter of thionyl chloride, while cooling with ice, and the solution is slowly warmed to the reflux temperature. The temperature is maintained for 2 hours, the excess thionyl chloride is then distilled off, the mixture is diluted with 500 ml of toluene and the toluene is distilled off. Recrystallisation in cyclohexane gives 115 g of the product with a melting point of 116° C.

2. Prepartion and testing of an aromatic polyester 0.646 g (2 millimoles) of tetra-n-butylammonium bromide and 370 g of methylene chloride were added to a solution of 45.6 g (0.2 mole) of bisphenol A and 16.5 g (0.412 mole) of sodium hydroxide in 912 g of distilled water. A solution of 40.6 g (0.2 mole) of an equimolar mixture of isophthaloyl and terephthaloyl chloride and 2.18 g (7.9 millimoles) of chain stopper from Example 1 in 60 g of methylene chloride was stirred into this mixture at 20°-25° C. in the course of 5 minutes. The mixture was stirred at a pH value of 12-13 for a further 20 minutes, the temperature being kept at 25° C. The organic phase was then separated off and washed with 5% strength by weight phosphoric acid and with water. The methylene chloride solution was concentrated and the product was dried at 80° C. in a vacuum drying cabinet for 12 hours. The product had a relative solution viscosity of 1.196 (measured in 5 g/l in CH$_2$Cl$_2$ at 25° C.).

The product was irradiated as an 8% strength solution in methylene chloride with a UV lamp (type: Philips HPK 125 W) for eight hours. The sample then had a relative solution viscosity of 1.250 (measured as above).

3. Preparation and testing of an aromatic polyester

Example 2 is repeated with 2.07 g (7.5 millimoles) of chain stopper from Example 1. An aromatic polyester with a relative solution viscosity of 1.248 is obtained. The product was irradiated as in Example 2 and then had a relative solution viscosity of 1.323. (In both cases measured as in Example 2).

4. Preparation of

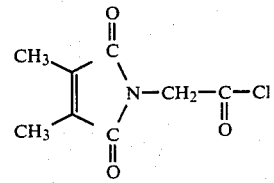

Starting from 54 g (0.72 mole) of glycine, 91 g (0.72 mole) of dimethylmaleic anhydride and 600 ml of glacial acetic acid, the procedure followed was as described in Example 1. Yield: 98 g (75% of theory) of white crystals.

The reaction with thionyl chloride was also carried out according to Example 1. 90 g (66% of theory) of an orange liquid (boiling point under 0.6 mbar: 90.5°-92° C.) were obtained by distilling the crude product.

5. 100 g (0.79 mole) of dimethylmaleic anhydride are dissolved in 400 g of toluene and 5 g of acetic acid under nitrogen in a flask with a stirrer, thermometer, dropping funnel, distillation bridge and nitrogen inlet, and the solution is heated to 100° C. 48.3 g (0.79 mole) of ethanolamine in 192 g of methanol are added dropwise to this solution, and at the same time the methanol is distilled off. The toluene is then distilled off and the product is fractionated in vacuo.

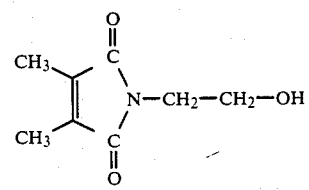

Boiling point under 0.5 mm Hg: 123° C., amount weighed: 119 g (90% of theory), pale yellow oil. (See DE-OS (German Published Specification) No. 2,934,578).

6. Preparation of

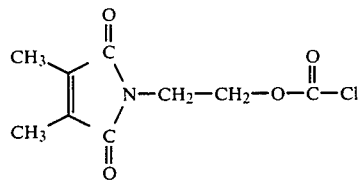

32 g (0.4 mole) of pyridine were initially introduced into 600 ml of methylene chloride at −10° C. in a three-necked flask with a stirrer, thermometer, reflux condenser and nitrogen inlet, dropping funnel and phosgene inlet, and 19 g (0.19 mole) of phosgene were passed in.

10.5 g (0.06 mole) of the yellow oil of

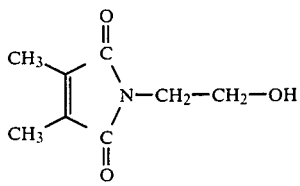

Example 5, dissolved in 100 ml of methylene chloride, were added dropwise to this solution and the mixture was allowed to react at 20° for 1 hour.

The resulting solution of the chlorocarbonic acid ester can be used for the polyester preparation according to the invention by the pyridine process.

7. Preparation of

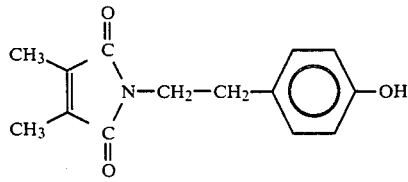

Starting from 24.7 g (0.18 mole) of tyramine, 22.7 g (0.18 mole) of dimethylmaleic anhydride and 200 g of glacial acetic acid, the procedure followed is as described in Example 1. 16 g of white crystals of the product with a melting point of 139°–140° C. are obtained. Yield: 36%.

We claim:

1. A process for the production of an aromatic polyester having dimethylmaleimide end groups and a weight average molecular weight, determined by light scattering, of between 3,000 and 150,000, from a diphenol, terephthalic acid dichloride, isophthalic acid dichloride and 0.5 to 40 mole %, based on the moles of the diphenol of a chain stopper, the ratio between the aromatic acid dichlorides being between 7:3 and 3:7, by the phase boundary process or by the homogeneous solution process, said chain stopper conforming to

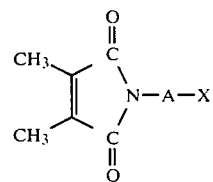

wherein the X—A—radical denotes X—$C_1$-$C_8$-alkyl, X—$C_5$-$C_6$-cycloalkyl, X—$C_7$-$C_{28}$-aralkyl or a radical of the formula

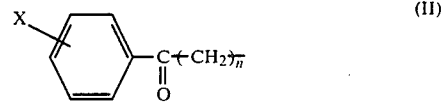

wherein n is an integer of from 1 to 8 and X—denotes a group which functions as the reactive part of said chain stopper.

2. The process of claim 1 further comprising a chain stopper other than the chain stopper of formula (I) in an amount no greater than said chain stopper of formula (I).

3. The process of claim 1 wherein said chain stopper, terephthalic acid dichloride and isophthalic acid dichloride are present at a total amount of 1 to 20 mole % relative to the moles of said diphenol.

4. The process of claim 1 wherein said chain stopper, terephthalic acid dichloride and isophthalic acid dichloride are present at a total amount of 1.5 to 10 mole % relative to the moles of said diphenol.

5. A process according to claim 1, in which X—denotes

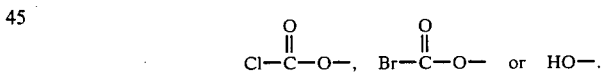

6. A process according to claim 5 in which X denotes

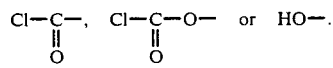

7. The polyester produced by the process of claim 1.

8. The polyester produced by the process of claim 2.

9. An aromatic polyester having a weight average molecular weight of between 3,000 and 150,000, determined by light scattering, of the general formula

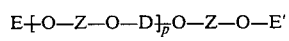

wherein
O—Z—O denotes a diphenolate radical,
—D—denotes

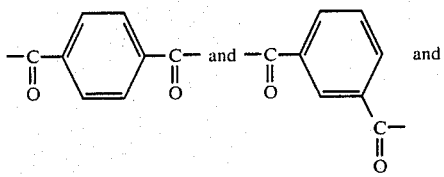 (i)

(iii) from 0 to 50 mol % based on the total of (i)+(ii)+(iii) of

with the proviso that the molar ratio (i)/(ii) is between 3:7 and 7:3,

E and E' are chain terminating radicals comprising 0.5 to 40 mole % relative to said diphenolate of radicals conforming to formula I of claim 1, and p is the degree of polymerization which corresponds to said molecular weight.

10. A polyester according to claim 9 in which —O—Z—O denotes a diphenolate radical having 6 to 30 carbon atoms.

11. A process for increasing the molecular weight of the polyester of claim 9 in which said polyester is irradiated with ultraviolet or visible light.

12. A process according to claim 11, in which the polyester contains a UV absorber.

13. A process according to claim 11, in which polyester is exposed to natural weather by sunlight.

14. A polyester obtained by the process of claim 11.

* * * * *